United States Patent [19]
Johnston

[11] 3,962,796
[45] June 15, 1976

[54] AXLE ALIGNMENT APPARATUS

[75] Inventor: Harry R. Johnston, Coatesville, Pa.

[73] Assignee: American Machine Products Corporation, Coatesville, Pa.

[22] Filed: Feb. 19, 1975

[21] Appl. No.: 551,019

[52] U.S. Cl.................................. 33/288; 33/193; 33/DIG. 21; 331/DIG. 1; 356/154
[51] Int. Cl.².......................................... G01B 5/25
[58] Field of Search................ 33/193, 203, 203.12, 33/203.13, 203.14, 203.15, 203.17, 203.18, 203.19, 203.2, 203.21, 286, DIG. 21, 287, 288, 289, 290; 356/154, 155, 138, 153; 331/DIG. 1

[56] References Cited
UNITED STATES PATENTS

| | | | |
|---|---|---|---|
| 3,325,905 | 6/1967 | Hurst | 33/193 |
| 3,566,476 | 3/1971 | McWhorter | 33/193 X |
| 3,619,069 | 11/1971 | Alexander | 33/138 |

Primary Examiner—Richard E. Aegerter
Assistant Examiner—Michael H. Thaler
Attorney, Agent, or Firm—Stanley B. Kita

[57] ABSTRACT

Apparatus for aligning the axle of a vehicle such as a truck, bus, etc., comprises a carriage adapted to be rolled into position adjacent the axle, a beam mounted on the carriage to pivot about a horizontal axis orthogonal to the axle, and means for projecting a laser ray coaxial with the pivot axis of the beam and onto a target positioned forwardly of the axle at a predetermined location with respect to the frame of the vehicle. The underside of the axle is engaged by a pair of forks adjustably carried by the beam to position the beam parallel to the axle. A centering mechanism is provided to center the laser with respect to the axle by causing the beam pivot axis to move laterally into a central position between the wheels of the vehicle. Preferably, the laser also projects a ray rearwardly through a central bore in the beam pivot pin to facilitate alignment of the laser with the pivot axis of the beam.

4 Claims, 10 Drawing Figures

U.S. Patent   June 15, 1976   Sheet 1 of 3   3,962,796
FIG.1.
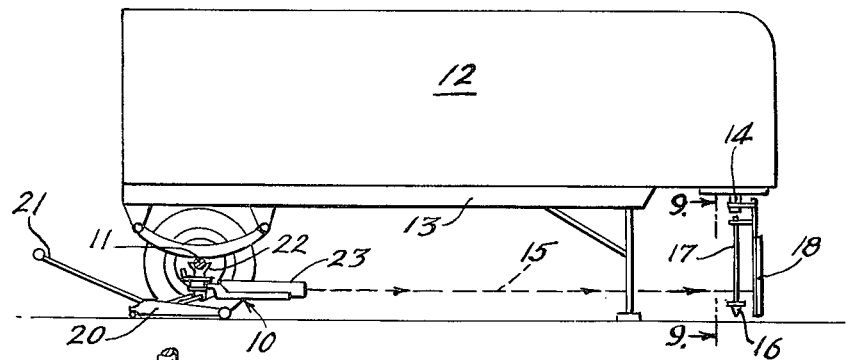
FIG.3.
FIG.5.
FIG.9.
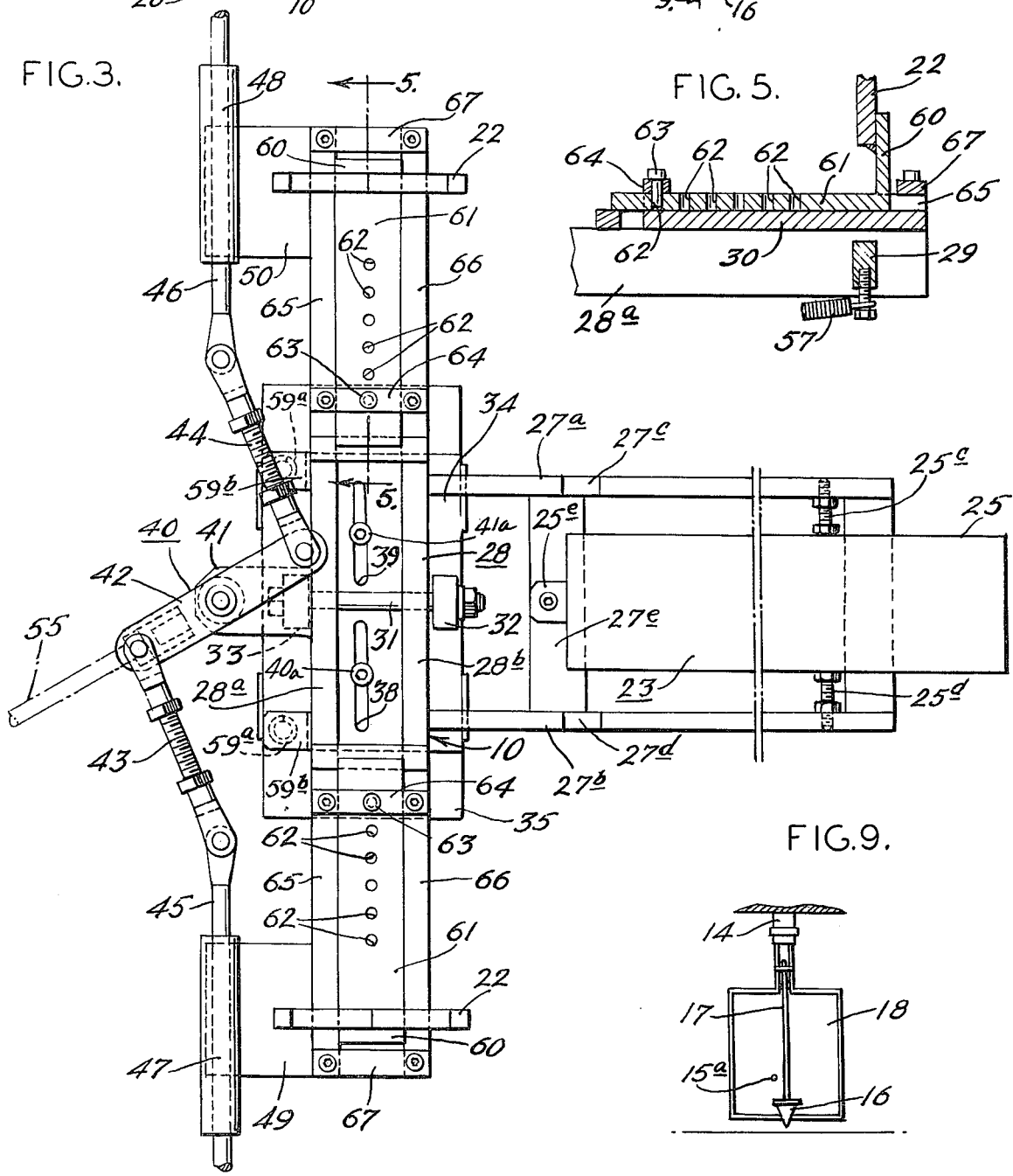

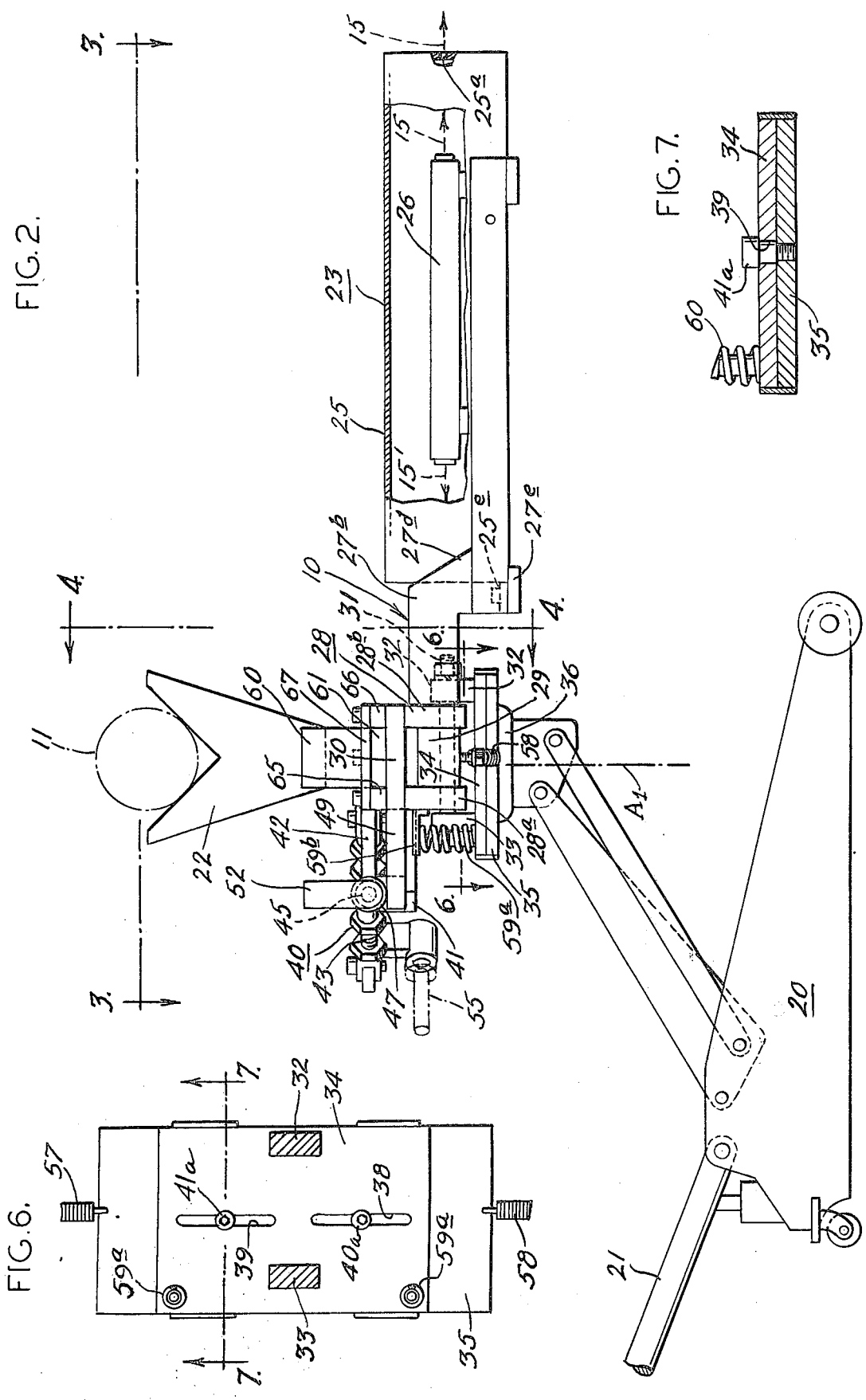

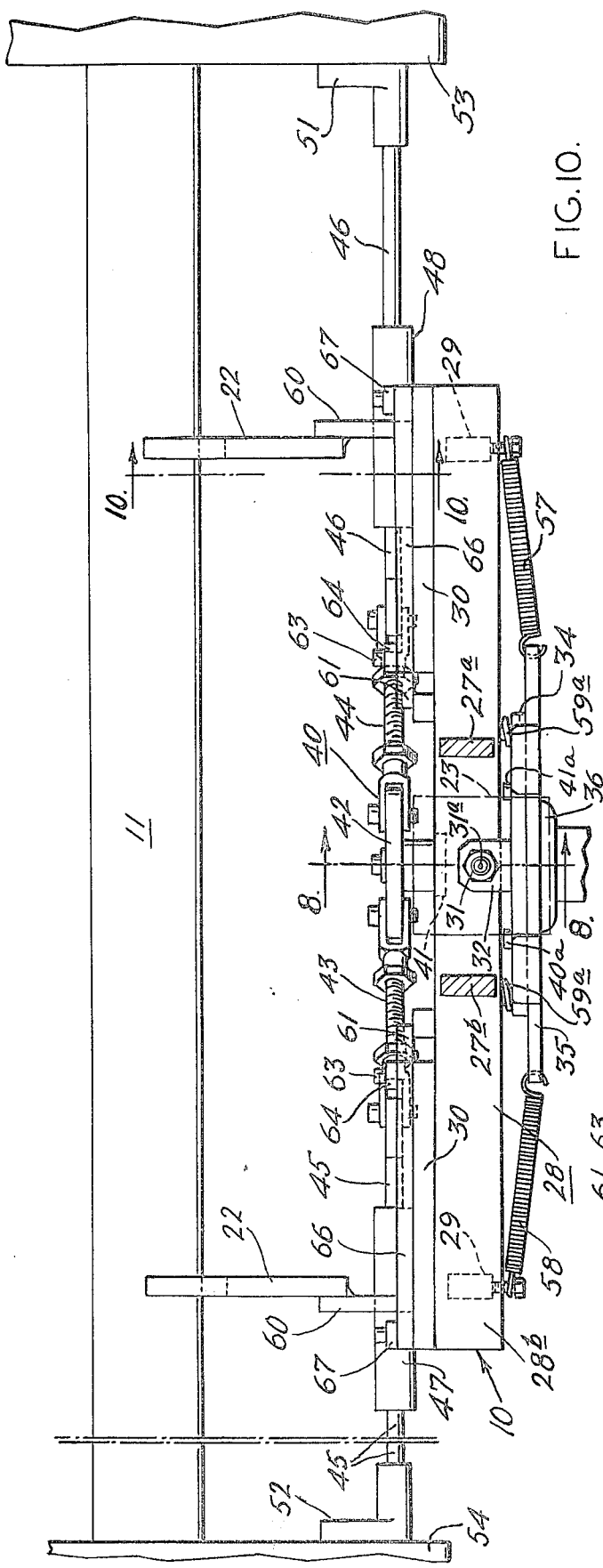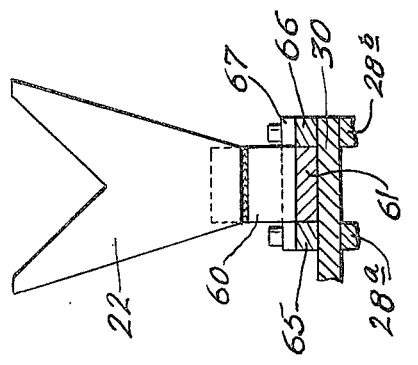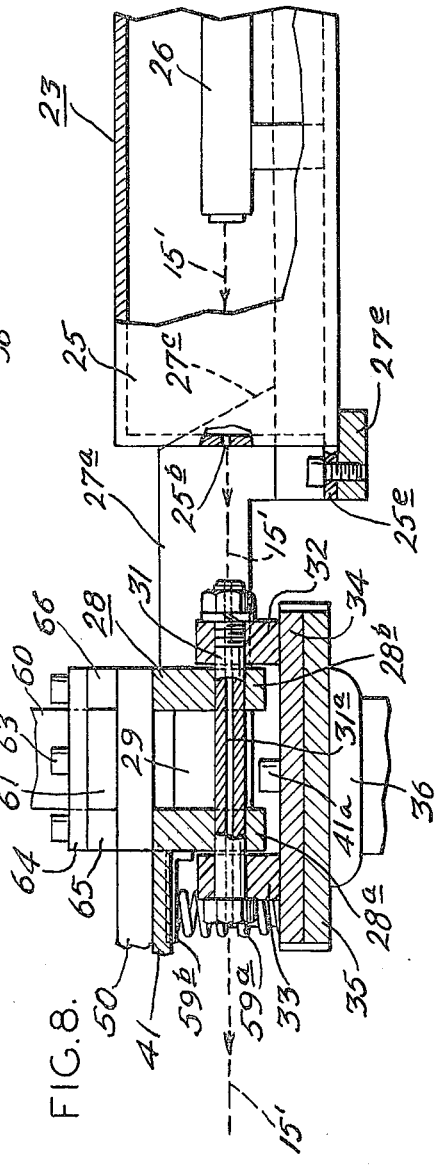

AXLE ALIGNMENT APPARATUS

The present invention relates to wheel alignment devices, and more particularly, the present invention relates to apparatus for use in aligning the axle of a vehicle with respect to its frame.

Axle alignment apparatus is known. An example of such apparatus is disclosed in U.S. Pat. No. 3,325,905. The patented apparatus comprises a carriage which mounts a light source for projecting a beam of light from a location adjacent the axle of a vehicle and onto a target at the forward end of the vehicle. The apparatus includes means for engaging the underside of the axle and means for disposing the light source centrally between the wheels mounted on the axle.

Although the patented apparatus may function satisfactorily, it has certain limitations. For instance, the beam which carries the forks that engage the axle is mounted to the underlying carriage by means of a pivot pin. The pin affords pivotable movement of the beam about a horizontal axis extending transversely to the axle and is intended to accommodate small variations in the inclination of the axle, such as due to differing amounts of tread on the tires, different tire inflation pressures, etc. The light source is mounted to the beam at a location which is above the beam pivot axis; however, it has been found that with the light source so located, an error is induced in the alignment process, particularly when the axle and frame are not parallel to the surface which supports the vehicle.

In addition to the foregoing problems, the aforementioned patented apparatus has a relatively high profile which prevents it from being used with vehicles having less axle-ground clearance than trailers have. Moreover, the axles of automotive vehicles often have protrusions, links, etc., which tend to interfere with the placement of the axle-engaging forks. Hence, axle alignment apparatus which is capable of being used with a wide variety of vehicles is highly desirable.

The light source employed in the aforementioned patented structure includes a projector which projects crossed reference lines onto a screen. This device may operate satisfactorily in a darkened garage; however, it is not capable of being used in a moderately or brightly lit area such as in a parking lot. A laser has been used commercially by the assignee of the present application in place of the conventional light source, and although the laser functions satisfactorily, it is important for the axis of the laser to be oriented orthogonal to the axle of the vehicle if accurate results are to be obtained. In the patented apparatus, a relatively complex gaging apparatus is employed to check the alignment of the light source with the beam. Needless to say, axle alignment apparatus wherein the light source is capable of being aligned accurately with the beam to which it is mounted without complicated accessory equipment and/or skilled workmen is commercially desirable.

With the foregoing in mind, it is a primary object of the present invention to provide improved apparatus for aligning the axle of a vehicle with respect to its frame.

It is another object of the present invention to provide novel axle alignment apparatus which is highly accurate even when used on relatively uneven surfaces.

A further object of the present invention is to provide unique axle alignment apparatus which has a relatively low profile and which is capable of being adjusted readily to afford its use on vehicles such as trucks, buses, etc., having axles with relatively low ground clearances.

Yet another object of the present invention is to provide axle alignment apparatus having improved means for effecting alignment of its reference light beam with respect to certain reference points on the apparatus to afford alignment without complicated equipment and/or skilled personnel.

More specifically, the present invention provides apparatus for aligning an axle and wheel assembly of a vehicle with respect to the frame of the vehicle. The apparatus comprises a carriage adapted to be moved into proximity with the axle, means providing a horizontal fulcrum on the carriage, a beam mounted to pivot about the fulcrum, means carried on the beam at spaced locations for engaging the axle and disposing the beam parallel to the axle, and means mounting a source of light to the carriage in such manner as to cause a ray of light projected by the source to be disposed coaxial with the fulcrum about which the beam pivots. In addition, there is provided means mounting the fulcrum for horizontal movement relative to the carriage and the axle, and means is provided for centering the fulcrum between the wheels. Preferably, the source of illumination includes a laser having bidirectional light-emitting capabilities, and the fulcrum is provided by a pivot pin which has a central through bore for conducting a ray of light therethrough to afford accurate alignment of the laser with respect to the pivot axis of the beam. The beam carries a pair of axle engaging forks which are adapted to engage the underside of the vehicle axle, and the forks are mounted for sliding movement toward and away from one another on the beam thereby being adjustable so as to be positioned away from any obstructions which may be present on the axle.

These and other objects, features and advantages of the present invention should become apparent from the following description when taken in conjunction with the accompanying drawings in which:

FIG. 1 is a schematic view illustrating the apparatus of the present invention being used in conjunction with aligning the axle of a trailer;

FIG. 2 (sheet 2) is a greatly enlarged side elevational view of the apparatus illustrated in FIG. 1 with the axle illustrated in broken lines;

FIG. 3 is a foreshortened view taken along line 3—3 of FIG. 2;

FIG. 4 (sheet 3) is a foreshortened sectional view taken along line 4—4 of FIG. 2;

FIG. 5 is an enlarged fragmentary sectional view taken along line 5—5 of FIG. 3;

FIG. 6 is a sectional view taken along line 6—6 of FIG. 2;

FIG. 7 is a sectional view taken along line 7—7 of FIG. 6;

FIG. 8 is an enlarged fragmentary sectional view taken along line 8—8 of FIG. 4;

FIG. 9 is an enlarged sectional view taken along line 9—9 of FIG. 1; and

FIG. 10 is a sectional view taken along line 10—10 of FIG. 4.

Referring now to the drawings, FIG. 1 illustrates axle alignment apparatus 10 embodying the present invention. The apparatus is illustrated being used to align the axle 11 of a trailer-type vehicle 12; however, it is contemplated that the apparatus 10 may be used to align the axles of other vehicles such as buses, trucks, etc.

The illustrated trailer 12 has a frame 13 and a kingpin 14 adapted to be hitched to a tractor (not shown). Alignment of the axle 11 is particularly important for tractor-trailer rigs since trailers will not track properly behind the tractor if their axles are not aligned, i.e., disposed orthogonal to the drawpoint provided by their kingpins. As a result, the tires of trailers having misaligned axles wear unevenly and/or prematurely. Of course, when the axle 11 is aligned properly with respect to the kingpin 14, the trailer tracks properly, and the wear life of the tires is improved. This is also true for automotive vehicles such as buses, trucks, etc. having steerable front wheel and driven rear wheels. Furthermore, the growing use of anti-skid devices on heavy road vehicles makes it imperative that the axles of such vehicles be properly aligned.

In the present invention a discrete ray of light is projected onto a temporary screen spaced from the axle to check axle alignment. To this end, the apparatus 10 comprises a carriage 20 for wheeling a source of light 23 into and out of proximity with the axle 11 of the trailer 12. The carriage 20 has a conventional jacking mechanism with an operating lever 21 which operates to raise and lower a pair of axle-engaging forks 22, 22 so that a source of illumination 23 mounted on the carriage 20 projects a ray of light 15 forwardly and orthogonal to the axle 11 onto a temporary screen 18 which depends from the kingpin 14. A plumb bob 16 depends from a cable 17 mounted rearwardly of the screen 18. Preferably, the diameter of the plumb bob cable 17 is slightly greater than the diameter of the light ray 15, so that when the axle 11 is properly aligned with the kingpin 14, the cable 17 intercepts the light ray 15, and the ray 15 is not projected onto the screen 18. However, when the axle is not aligned properly, i.e., when it is not disposed orthogonal to a line through its center through the kingpin 14, the projected ray 15 strikes the screen 18 either to the right or to the left of the plumb bob cable 17. For example, if the ray 15 strikes the screen 18 to the left of the cable 17 (as indicated by the mark 15a in FIG. 9) adjustment of the axle 11 in the clockwise direction (in plan) is indicated, and if the ray 15 is projected to the right of the plumb bob cable 17, counterclockwise adjustment of the axle is indicated. Adjustment of the axle with respect to the frame 13 is effected in a conventional manner as should be apparent to one skilled in the art; however, for a more detailed discussion of one way in which such adjustment may be made, reference is made to U.S. Pat. No. 3,325,905 which is incorporated herein by reference.

In the illustrated apparatus the light source 23 includes a laser 26 mounted in a housing 25 carried by the carriage 20. The laser 26 is aligned with a pair of apertures 25a and 25b in the front and rear of the housing 25, respectively, and the laser 26 has bidirectional light-emitting capabilities, i.e., it projects a light ray axially in opposite directions. The ray 15 projected forwardly has a diameter of about ¼ inch. Preferably, the laser 26 is a helium-neon type sold by Spectra-Physics of Mountain View, Calif. as its Model 155. The laser 26 is powered by a conventional source of electrical energy; however, for the sake of simplicity the wiring for the laser 26 has been omitted from the drawings.

The laser 26 is centered between the rear wheels of the trailer 12 during the alignment process. For this purpose, as best seen in FIGS. 3 and 4, the laser housing 25 is mounted to a frame defined by a pair of rails 27a and 27b which project forwardly in cantilever fashion from a beam 28. The beam 28 includes a pair of parallel members 28a and 28b which are fastened together at spaced locations by spacers 29, 29 (FIG. 4) and at their ends by gusset plates 30, 30 fastened to the top edges of the beam members and extending inwardly toward the center of the beam. The beam 28 is mounted to pivot about a horizontal axis by a pin 31 which passes through both members 28a and 28b and which is journalled in stanchions 32 and 33 mounted on a platen 34 outboard of the beam members 28a and 28b. The platen 34 in turn is mounted for sliding movement relative to an underlying base plate 35 which is securely fastened to a bearing assembly 36 mounted to the jacking mechanism of the carriage 20. The bearing assembly 36 affords pivotable movement of the plate 35 about a vertical axis $A_1$ relative to the carriage 20. Horizontal movement of the platen 34 relative to the underlying member 35 is limited by a pair of slots 38 and 39 and cooperating cap screws 40a and 41a, respectively, which are threaded into the underlying base 35 and which engage the upper side of the platen 34. Thus, the housing 25 for the laser 26 is capable of moving laterally relative to the carriage 20.

In order to afford rapid centering of the laser 26 and the light ray 15 with respect to the axle 11, a centering mechanism 40 (FIG. 3) is provided. The centering mechanism 40 includes a tang 41 which is welded to the rear beam member 28a and a link 42 mounted to the tang 41 to pivot about a vertical axis. Opposite ends of the link 42 are connected by adjustable links 43 and 44 to rods 45 and 46, respectively. The rods 45 and 46 are slidably received in journals 47 and 48 which are secured to the beam 28 by means of plates 49 and 50, respectively, which are rearward extensions of the gusset plates 30, 30. The outermost ends of the rods 45 and 46 carry upstanding feet 51 and 52 which are adapted to engage the insides of the wheels 53 and 54, respectively. An operating handle 55, indicated in broken lines in FIG. 3 is removably engaged with the link 42. With this structure, pivotal movement of the handle 55 in the counterclockwise direction (FIG. 3) causes the rods 45 and 46 to slide outwardly for engaging the feet 51 and 52 with the wheels 53 and 54, respectively. Thus, if the carriage 20 is not perfectly centered with respect to the axle 11 when initially wheeled into proximity therewith, engagement of the feet 51 and 52 with the wheels 53 and 54 causes a reaction to be applied to the tang 41, and this in turn causes the beam 28 to move rightward or leftward, depending upon whether the laser 26 is to the right or the left of the center of the axle 11. A pair of extension springs 57 and 58 are connected at one end to the plate 35 and at their other ends to the inside beam spacer 29, 29. The springs 57 and 58 return the beam 28 to a central location with respect to the plate 35 when the apparatus 10 is not in use. In addition, a pair of compression springs 59a, 59a (FIG. 3) are mounted between the platen 34 and abutments 59b, 59b which project rearwardly from the rear beam member 28a at spaced locations. The compression springs 59 and 60 function to level the beam 28 when the apparatus is not in use.

According to the present invention, the laser 26 is mounted to the beam 28 in such a manner as to cause the light ray 15 emitted thereby to be unaffected by variations in the inclination of the axle 11 or in the underlying surface on which the carriage 20 is supported. To this end, means is provided to mount the laser 26 coaxial with the pivot pin 31 (FIG. 8). In the illustrated embodiment, the mounting means is provided by the frame members 27a and 27b which are offset downwardly at 27c and 27d, respectively, adjacent the rear of the laser housing 25. The amount of the offset is sufficient to cause the laser tube 26 to be at the same vertical level as the pin 31, while at the same time lowering the profile of the entire assembly, thereby affording its use with vehicles having relatively low axle-ground clearances. Since the laser 26 is mounted centrally in the housing 25, disposition of the housing 25 centrally between the frame members 27a and 27b aligns the laser beam 26 horizontally with respect to the pivot 31. By virtue of this structure, the light ray 15 projected by the laser 26 is coaxial with the axis provided by the pivot pin 31, so that the projection of the light ray 15 onto the screen 18 is not affected by any of the aforementioned variables. Accordingly, improved accuracy is obtained in the alignment of the axle 11 with respect to the frame 13 of the trailer 12.

In order to align the laser 26 with respect to the pivot pin 31, the laser housing 25 has a rearwardly-extending tang 25e which is mounted to pivot about a vertical axis to a frame element 27e which spans between the other frame elements 27a and 27b. A pair of threaded adjustment mechanisms 25c and 25d are provided between the front sides of the laser housing 25 and the frame elements 27a and 27b, respectively. Operation of these assemblies in a well known manner causes the casing 25 to pivot about the vertical axis through the tang 25e.

In accordance with another object of the present invention, the laser 26 is capable of being aligned accurately with respect to the pivot pin 31. For this purpose, the pivot pin 31 is provided with a central through bore 31a, and the laser 26 projects a ray of light 15' rearwardly through the aperture 25b in the housing 25 (FIG. 8). Thus, a workman can align the laser 26 accurately and easily with respect to the pivot pin 31 by turning the adjustment mechanisms 25b and 25c until the rearwardly projecting light ray 15' passes through the bore 31a in the pivot pin 31. In other words, a workman can check the alignment of the laser 26 with respect to the beam 28 prior to aligning a vehicle axle simply by energizing the laser 26 and holding his hand rearwardly of the pivot pin 31a. The absence of light passing through the bore 31a is an indication that the laser 26 is misaligned with respect to the pivot pin 31 and that adjustment of the laser housing 25 in its frame is indicated.

As noted heretofore, the axles of some vehicles mount auxiliary equipment such as: brake-actuating mechanisms, rear gear housings, etc. In order to enable the apparatus 10 of the present invention to be used effectively in aligning axles of such vehicles, the forks 22, 22 (FIG. 4) are mounted to the beam 28 in a manner affording their adjustment relative to the beam so that the forks 22, 22 can be positioned so as to engage such axles at locations clear of the auxiliary equipment. To this end, each fork, such as the right hand fork 22 (FIG. 4) is welded to an L-shaped support 60 having an elongated extension 61 which extends along the upper side of the beam 28. As best seen in FIG. 10, each extension 61 is guided laterally by a pair of rails 65 and 66 which are fastened in parallel relation to the top of the gusset plate 30, 30 and which engage the edges of the extension 61. The extension 61 has a series of axially spaced holes 62, 62 which are adapted to be engaged by a pin 63 removably carried in a transverse bar 64 which spans across the upper sides of the beam members 28a and 28b adjacent the center of the beam 28. Stops 67, 67 (FIG. 30 3) the ends of the beam 28 prevent the forks 22, 22 from disengaging the beam 28. Thus, the forks 22, 22 may be positioned as desired relative to the beam 28 after the carriage 20 is wheeled into proximity with the axle 11.

Before using the apparatus to align the axle 11 of the trailer 12, the alignment of the laser 26 with respect to the pivot pin 31 is checked by observing the presence or absence of a beam of light passing rearwardly through the bore 31a in the pin 31. As noted above, when such a beam passes through the pin 31, the laser 26 is in alignment with the pivot pin 31 and is ready for use in the axle alignment process. Preferably, this check is made after the carriage is wheeled into proximity with the axle to be aligned since movement of the carriage over a rough surface may cause misalignment to occur.

After the carriage is positioned about centrally of the axle 11, the forks 22, 22 are adjusted relative to the beam 28, and the pins 63, 63 (FIG. 5) are inserted in one of the holes 62, 62 of each fork extension 61 to secure the forks 22, 22. The jacking handle 21 is then actuated to raise the forks 22, 22 into engagement with the underside of the axle 11. The handle 55 of the centering mechanism 40 is then engaged with the link 42 and is pivoted to displace the laser 26 laterally with respect to the carriage 20. Since the pivot pin 31 is orthogonal to the beam 28; the laser 26 is coaxial with the pivot pin 31; and the beam 28 is parallel with the axle 11 as determined by the engagement therewith of the forks 22, 22, the light ray 15 projected by the laser 26 is orthogonal to the axle 11. Thus, if the light ray 15 strikes the screen 18 to the left of the plumb bob cable 17 (such as illustrated in FIG. 9), the position of the axle 11 is adjusted until the cable 17 intercepts the light ray 15 so that a spot is not projected onto the screen 18. When this occurs, the axle 11 is orthogonal to the kingpin 14. Thereafter, the centering mechanism 40 is disengaged from the insides of the wheels; the forks 22, 22 are lowered from the axle 11; the carriage is wheeled to its storage location; and the screen 11 and plumb bob assembly are disconnected from the kingpin 14. Since the axle 11 is now orthogonal to the kingpin 14, the trailer will track properly when pulled by a tractor; the wear life of the tires will be increased; and better control of the tractor-trailer rig is obtained, particularly when the rig is provided anti-skid devices.

In view of the foregoing, it should be apparent that the present invention provides axle alignment apparatus which operates with improved accuracy even when the apparatus and/or vehicle is located on an uneven surface. Moreover, the apparatus has a relatively low profile which affords its use with vehicles where the clearance between the axle and the road is at a minimum. The apparatus is also capable of being set-up and checked rapidly with a minimum of complicated equipment and/or skilled personnel. Furthermore, the adjustable forks permit the apparatus to be used with a wide variety of vehicles having different axle configurations.

While a preferred embodiment of the present invention has been described in detail, various modifications, alterations and changes may be made without departing from the spirit and scope of the present invention as defined in the appended claims.

I claim:

1. An apparatus useful in aligning an axle and wheel assembly of a vehicle with respect to the frame of the vehicle, including a carriage adapted to be moved into proximity with the axle, means providing a horizontal fulcrum on said carriage, a beam mounted to pivot about said fulcrum, means carried on said beam for engaging the axle at spaced locations for disposing the beam parallel to the axle, and a source of light carried by said carriage for projecting a ray of light transversely to said beam to facilitate alignment of the axle with the vehicle frame, wherein the improvement comprises: means mounting said light source to said beam so that the ray is disposed coaxial with said fulcrum, means mounting said fulcrum for horizontal movement relative to said carriage and axle, and means cooperating with said fulcrum mounting means and said wheel and axle assembly for centering said fulcrum with respect to said axle, whereby accurate axle alignment apparatus is provided.

2. Apparatus according to claim 1 wherein said centering means includes a tongue extending laterally from said beam, a link mounted to said tongue for rotation about a vertical axis, a pair of feelers connected to said link at diametrically opposite locations with respect to said vertical axis and extending alongside said beam for engaging spaced confronting surfaces of said wheel assembly, and means carried by said beam for mounting said feelers for movement alongside said beam.

3. An apparatus useful in aligning an axle and wheel assembly of a vehicle with respect to the frame of the vehicle, including a carriage adapted to be moved into proximity with the axle, means providing a horizontal fulcrum on said carriage, a beam mounted to pivot about said fulcrum, means carried by said beam for engaging the axle at spaced locations for disposing the beam parallel to the axle, and a laser for projecting a ray of light forwardly away from said beam, the improvement wherein said fulcrum means has an elongated through bore providing a light transmission passage axially therethrough and wherein said laser emits a ray of light rearwardly toward said beam coaxial with said forwardly projected ray, and including means mounting said laser to said beam for adjustment relative to said fulcrum means to afford disposition of said laser orthogonal to said beam, whereby the laser is properly oriented with the beam when the rearwardly projected light ray is transmitted through the bore in the fulcrum.

4. Apparatus useful in aligning an axle and wheel assembly of a vehicle with respect to the frame of the vehicle, comprising: a carriage adapted to be moved into proximity with the axle, fulcrum means providing a horizontal axis on said carriage, means on said carriage mounting said fulcrum for adjustable movement transverse to said axis, means engageable with said wheel assembly and connected to said fulcrum mounting means to center said fulcrum with respect to said axle, a beam mounted to pivot about said fulcrum axis, a pair of forks carried by said beam for engaging the axle at spaced locations for disposing the beam parallel to the axle, means mounting said forks for adjustment relative to one another and said beam, a laser for projecting a ray of light orthogonal to said beam to facilitate alignment of the axle with the vehicle frame, and means mounting said laser at a fixed location with respect to said beam and closely adjacent said fulcrum so that said laser moves laterally with said beam upon actuation of said centering means, whereby accurate axle alignment apparatus is provided.

* * * * *